United States Patent
Merchant et al.

[11] Patent Number: 5,873,121
[45] Date of Patent: Feb. 16, 1999

[54] EFFICIENT MEMORY MANAGEMENT SYSTEM FOR MINIMIZING OVERHEAD IN STORAGE OF DATA TRANSMITTED IN A NETWORK

[75] Inventors: Shashank Merchant, Sunnyvale; Alok Singh, Fremont; Gopal Krishna, San Jose, all of Calif.

[73] Assignee: Advanced Micro Devices, Inc., Sunnyvale, Calif.

[21] Appl. No.: 753,025

[22] Filed: Nov. 19, 1996

[51] Int. Cl.$^6$ .................................................. G06F 12/02
[52] U.S. Cl. .......................... 711/173; 711/200; 711/202
[58] Field of Search ................................... 711/173, 200, 711/202; 395/200.08

[56] References Cited

U.S. PATENT DOCUMENTS

| | | | |
|---|---|---|---|
| 5,136,582 | 8/1992 | Firoozmand | 370/400 |
| 5,289,470 | 2/1994 | Chang | 711/173 |
| 5,293,381 | 3/1994 | Choy | 370/476 |

*Primary Examiner*—Tod R. Swann
*Assistant Examiner*—Esteban A. Rockett
*Attorney, Agent, or Firm*—Sawyer & Associates

[57] ABSTRACT

The present invention provides a method and apparatus for storing additional information, such as HOLE information, within a buffer while minimizing the overhead.

A method according to the present invention for efficiently storing additional information in a memory, the memory including at least one address, the memory for storing at least a portion of a packet to be transferred by a network system, the method comprising the steps of determining whether the at least a portion of a packet ends at a boundary of the at least one address; encoding a portion of the packet to indicate that the packet ends at the address boundary if the packet ends at the address boundary; and encoding a portion of the at least one address to indicate that the packet does not end at the address boundary, if the packet does not end at the address boundary.

22 Claims, 10 Drawing Sheets

| | $H_0$ | $H_1$ | $H_2$ | $H_3$ | EOP |
|---|---|---|---|---|---|
| | ∅ | ∅ | ∅ | ∅ | ∅ |
| | ∅ | ∅ | ∅ | ∅ | ∅ |
| | ∅ | ∅ | ∅ | ∅ | ∅ |
| | ∅ | 1 | 1 | 1 | 1 |

302

| | Byte 0 | Byte 1 | Byte 2 | Byte 3 |
|---|---|---|---|---|
| 0 | ▨ | ▨ | ▨ | ▨ |
| 1 | ▨ | ▨ | ▨ | |
| 2 | ▨ | ▨ | ▨ | |
| 3 | ▨ | | | |

| MEMORY | OVERHEAD |
|---|---|
| 32 Bits | 5 Bits |
| 64 Bits | 9 Bits |
| 128 Bits | 17 Bits |

| Before Shift | After Shift |
|---|---|
| 0 0 0 0 | 0 0 0 0 1 |
| 0 0 0 1 ... | 0 0 0 1 1 ... |
| 1 1 1 0 | 1 1 1 0 1 |
| 1 1 1 1 | 1 1 1 1 1 |

FIG. 8A

| $H_3$ | $H_2$ | $H_1$ | $H_0$ | Encoded Holes |
|---|---|---|---|---|
| 1 | 1 | 1 | ∅ | 0 0 0 1 0 |
| 1 | 1 | ∅ | ∅ | 0 0 1 1 0 |
| 1 | ∅ | ∅ | ∅ | 0 1 1 1 0 |

FIG. 8B

| $H_3$ | $H_2$ | $H_1$ | $H_0$ | Other Info | Encoded Value |
|---|---|---|---|---|---|
| 1 | 1 | 1 | ∅ | "info" | 0 0 1 0 0 |
| 1 | 1 | ∅ | ∅ | "info" | 0 1 0 0 0 |
| 1 | ∅ | ∅ | ∅ | "info" | 0 1 1 0 0 |

| MEMORY | OVERHEAD |
|---|---|
| 32 Bits | 3 Bits |
| 64 Bits | 4 Bits |
| 128 Bits | 5 Bits |

FIG. 10

| MEMORY | OVERHEAD |
|---|---|
| 32 Bits | 2 Bits |
| 64 Bits | 2 Bits |
| 128 Bits | 2 Bits |

EFFICIENT MEMORY MANAGEMENT SYSTEM FOR MINIMIZING OVERHEAD IN STORAGE OF DATA TRANSMITTED IN A NETWORK

FIELD OF THE INVENTION

The present invention is related to a system and method for reducing overhead required to maintain information, such as tag and hole information, in memory which may be located in the network controllers.

BACKGROUND OF THE INVENTION

In a network environment, data can either be sent out to a wire or received in from the wire, wherein the term "wire" can be any form of transferring information to and from another destination. For example, the term "wire" could include transferring information via satellite to and from other nodes within a network.

The speed at which data is sent to and from a CPU to the network controller is typically independent of the speed to and from the network controller to the wire. Thus, local buffers, such as receive and transmit buffers, are typically maintained to interface between the wire and the CPU.

A typical network controller can store multiple packets of data in its local buffer. To mark the packet boundary, an end of packet (EOP) tag is generally used. In cases where the buffer is organized in multiple bytes, information regarding the location of the end of the packet, hereinafter referred to as HOLE information, within that word typically needs to be maintained.

A conventional method of maintaining HOLE information determines whether packet data is valid at each byte location and stores the results. The problem associated with this method is the amount of extra memory space required to store the HOLE information. The extra amount of memory space is typically referred to as overhead. In the conventional method, the overhead typically becomes greater as the size of the memory increases.

Accordingly, what is needed is a system and method for storing additional information, such as HOLE information, within a buffer, and minimize the overhead requirements of the conventional network environment. The present invention addresses such a need.

SUMMARY

The present invention provides a method and system for storing additional information, such as HOLE information, within a buffer while minimizing the overhead.

A method according to the present invention for efficiently storing additional information in a memory, the memory including at least one address, the memory for storing at least a portion of a packet to be transferred by a network system, the method comprising the steps of determining whether the at least a portion of a packet ends at a boundary of the at least one address; encoding a portion of the packet to indicate that the packet ends at the address boundary if the packet ends at the address boundary; and encoding a portion of the at least one address to indicate that the packet does not end at the address boundary, if the packet does not end at the address boundary.

The overhead can be restricted to one bit for indication of end of packet, and one bit for indication of whether the other bits in the address are additional information. One way the present invention achieves this goal is by encoding a predetermined number of bits in a predetermined location plus using one of the encoded bits for indicating whether the remaining bits contain either packet data or additional information.

If the packet ends at an address, it is determined whether the data packet fills the entire address, herein referred to as the packet ending at the address boundary. If it does, then one bit is utilized to indicate that the packet ends at this address, and one of a predetermined number of bits is utilized to indicate that the packet ends at the address boundary. If the packet does not end at the address boundary, then the one of the predetermined number of bits is utilized to indicate that the unused portion of the address in which the packet ends is utilized to store the additional information, such as HOLE information.

DETAILED DESCRIPTION

The present invention relates to a method for storing additional information in a buffer storing a packet to be transferred. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a system and method for storing additional information, such as HOLE information, within a buffer while minimizing the overhead. The overhead can be restricted to one bit for indication of end of packet (EOP), and one bit for indication of whether the other bits in the address are additional information such as HOLE information. One way the present invention achieves this goal is by shifting the bits in the addresses and encoding a predetermined number of bits in a predetermined position within each address, such as five most significant bits.

Using the example of utilizing the five most significant bits, if the packet does not end at an address which is being evaluated, than the four most significant bits are preferably shifted to five bits and encoded to contain packet data, and to indicate that the information is packet data. If the packet ends at the address boundary which is being evaluated, then the four most significant bits are preferably shifted to five bits and encoded to contain packet data and one of the encoded bits is used to indicate that the encoded information is packet data. If, however, the packet does not end at the address boundary, then the four most significant bits are preferably shifted to five bits and encoded to contain information other than packet data. The information other than packet data will hereinafter be referred to as additional information. This additional information includes information such as HOLE information. In this instance, one of the encoded bits is used to indicate that the encoded information is additional information such as HOLE information.

Figure 1:
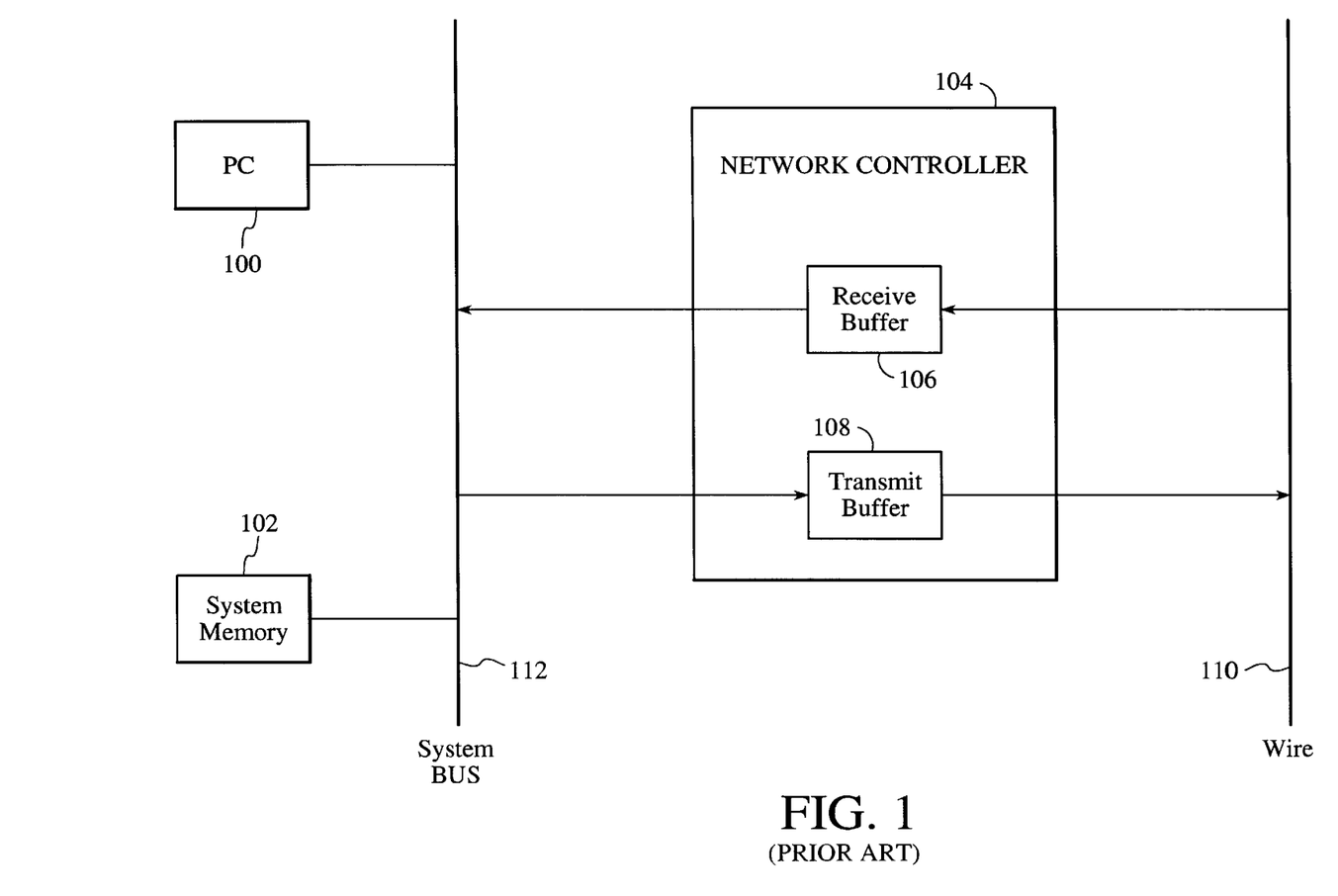
FIG. 1 is block diagram of a conventional network system.

FIG. 1 is a block diagram of a conventional network system. It includes a CPU 100, a system memory 102, a system bus 112, network controller 104, and a wire 110. The network controller controls buffers such as receive buffer 106 and transmit buffer 108. When data packets arrive from the wire 110 from a location such as other nodes of a network, it is temporarily stored in the receive buffer 106. When the CPU 100 is ready to receive the data packet, then the network controller sends the data packet out from the receive buffer to the system 112. Alternatively, when information is sent out to the wire, the data packet is sent from system 112 to the transmit buffer 108 and is stored until it is ready to be transferred to the wire 110.

Figure 2:
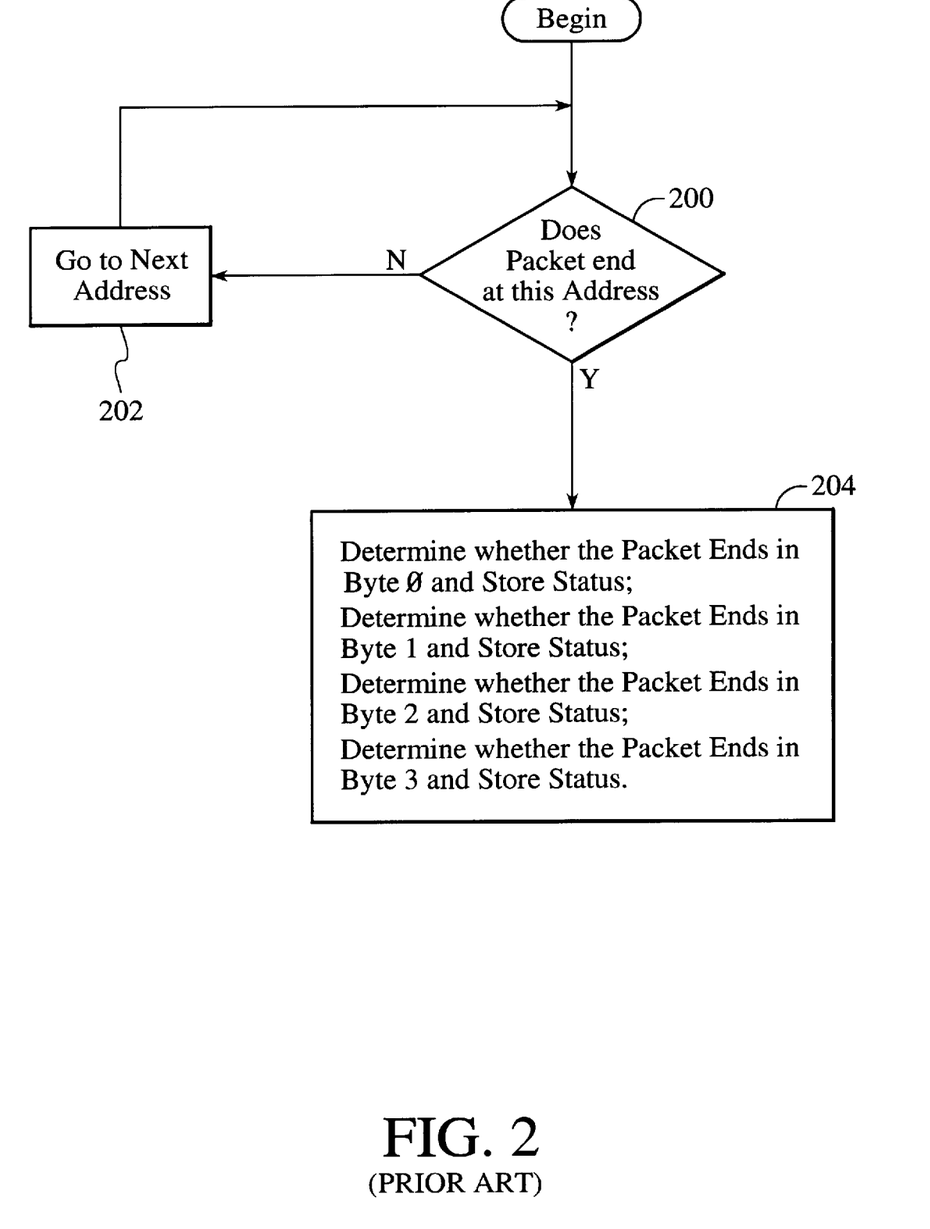
FIG. 2 is a flow diagram of a conventional method of maintaining HOLE information.
Figure 3:
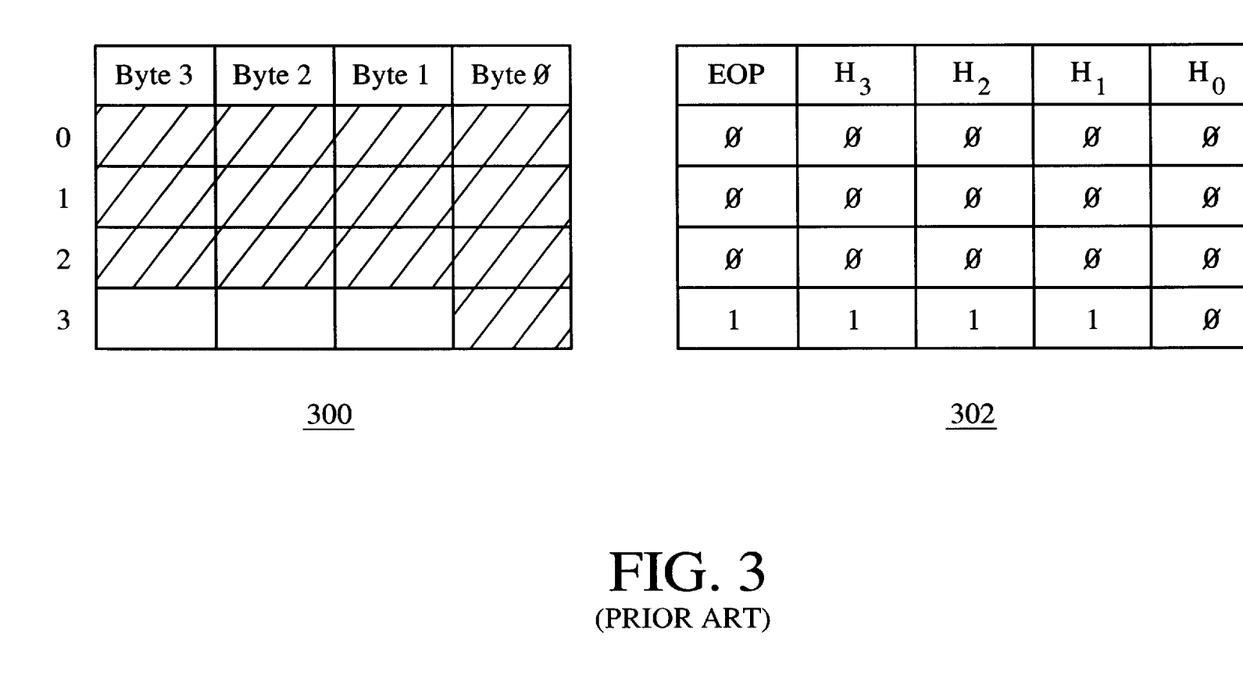
FIG. 3 includes a representation of a 32-bit wide buffer 300 and the memory space 302 required by the conventional method to maintain the end of packet and HOLE information.

FIGS. 2 and 3 illustrate a conventional method for maintaining HOLE information regarding an address. FIG. 2 is a flow diagram of the conventional method of maintaining HOLE information regarding an address in a 32-bit wide local buffer which is shown in the Figure to be located within a network controller. First, it is determined whether a packet ends at this address via step 200. If not, then the next address is assessed via step 202 and 200. When an address is found in which a packet ends, it is determined whether the packet ends in a first byte (byte 0) and stores a status bit; it is also determined whether the packet ends in a second byte (byte 1) and stores a status bit; it is determined whether the packet ends in a third byte (byte 2) and stores a status bit; and it is determined whether the packet ends in a fourth byte (byte 3) and the status is stored via step 204. The status bit indicates HOLE information of the byte. The determination of whether the packet ends at the respective bytes typically occurs simultaneously. If the memory is larger than 32-bits, then this determination process would continue until the last byte is reached.

This conventional method also can be seen in FIG. 3. FIG. 3 includes a representation of a 32-bit wide buffer 300 and the memory space 302 required by the conventional method to maintain the end of packet and HOLE information. In the portion of the memory 300, the horizontal axis represents bytes while the vertical axis represents addresses 0–3. In the portion of the memory 302, the column entitled EOP represents EOP tags corresponding to addresses 0→3 of 300, while $H_{0-3}$ represent HOLE information corresponding to bytes 0→3 of addresses 0→3 of 300. In this example, under EOP, 0 is used to indicate that the packet does not end at the particular address being evaluated, while 1 indicates that it does end at that address. 0 is also used to indicate that there is no HOLE at the corresponding byte for the corresponding address, while 1 indicates that there is a hole.

Assuming a packet consumes the entire address of addresses 0–2 and one byte of address 3, the corresponding information can be displayed as shown in 302. Under the EOP column, it indicates that the packet does not end in 0–2, but in address 3. Likewise, when an EOP is detected, there is an entry for each byte indicating whether or not it is a HOLE. For example, in the diagrams shown in FIG. 3, byte 0 of address 3 is not a HOLE while bytes 1–3 of address 3 are HOLES.

Figure 4:
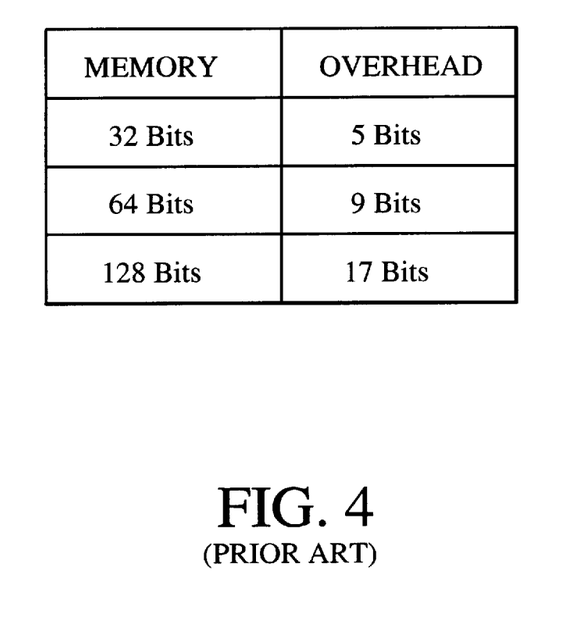
FIG. 4 is a chart associating the amount of overhead required for various sizes of memory in the conventional method of maintaining HOLE information.

Keeping track of HOLE information in the conventional manner requires several extra bits (i.e., status bits) as shown in FIG. 4. With a 32-bit memory the overhead for maintaining HOLE information is typically 5 bits, one bit to represent EOP tag and four bits to represent the HOLE information. The overhead for a 64-bit memory is typically 9 bits, 1 bit to represent the EOP tag and 8 bits to represent HOLE information. The overhead for 128-bit memory is typically 17 bits, 1 bit to represent EOP tag and 16 bits to represent HOLE information. What is needed is a system and method which reduces the overhead for maintaining HOLE information.

The present invention addresses such a need. The present invention is related to a system and method for reducing overhead required to maintain information, such as hole and tag information.

Figure 5:
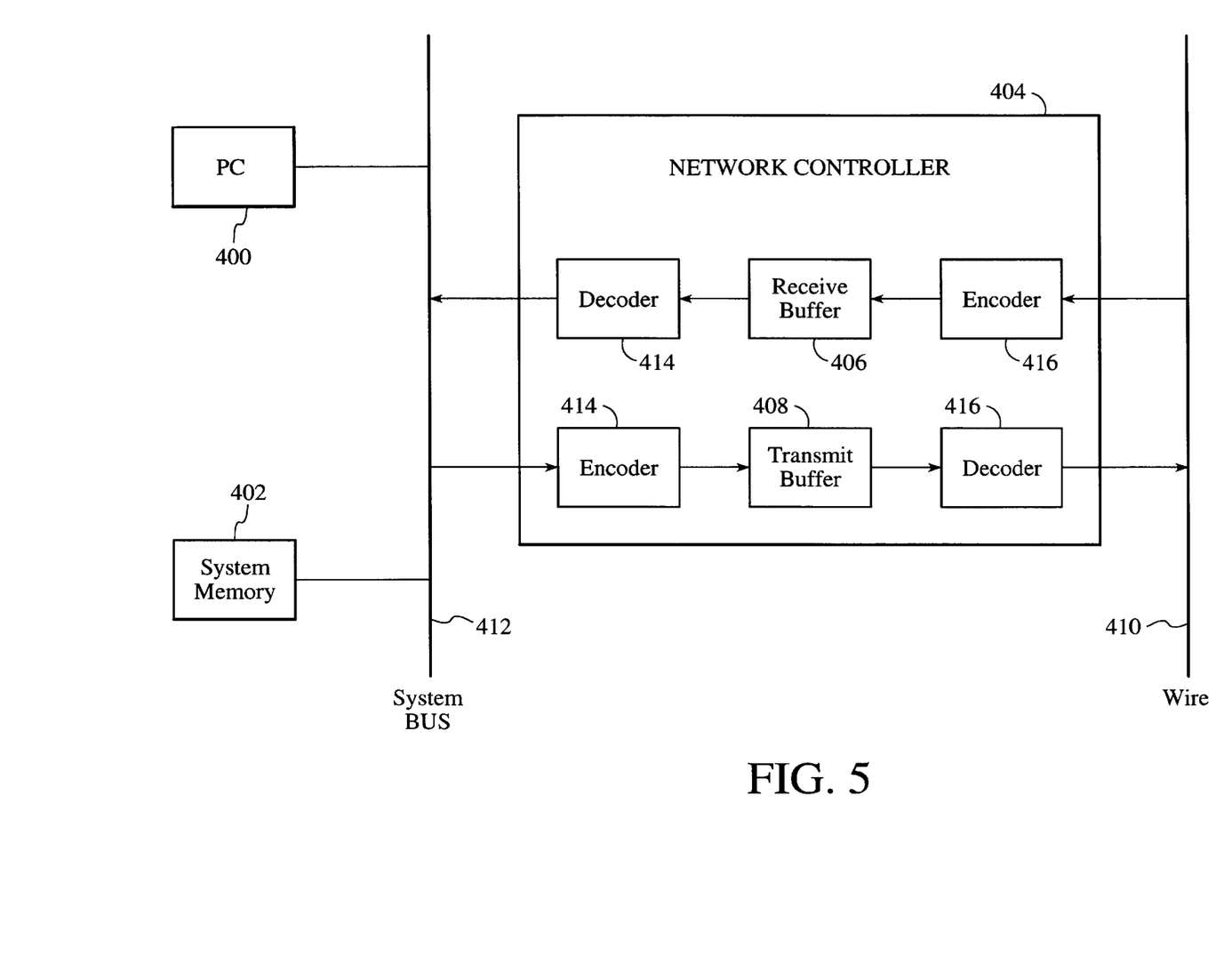
FIG. 5 is a block diagram of a system according to the present invention.

FIG. 5 is a block diagram illustrating a system according to the present invention. The system includes a CPU 400, system memory 402, system bus 412, network controller 404 and wire 410. A local buffer can be located either within 404 or outside the controller 404. In this illustration, there is a receive buffer 406 and a transmit buffer 408 shown within the network controller 404. Each buffer is shown coupled to an encoder 414 and a decoder 416. However, there are various ways of coupling the buffers to encoders and decoders which are well known in the art. Any of these well known methods of coupling the encoder and decoder with a buffer would suffice for this invention.

Figure 6:
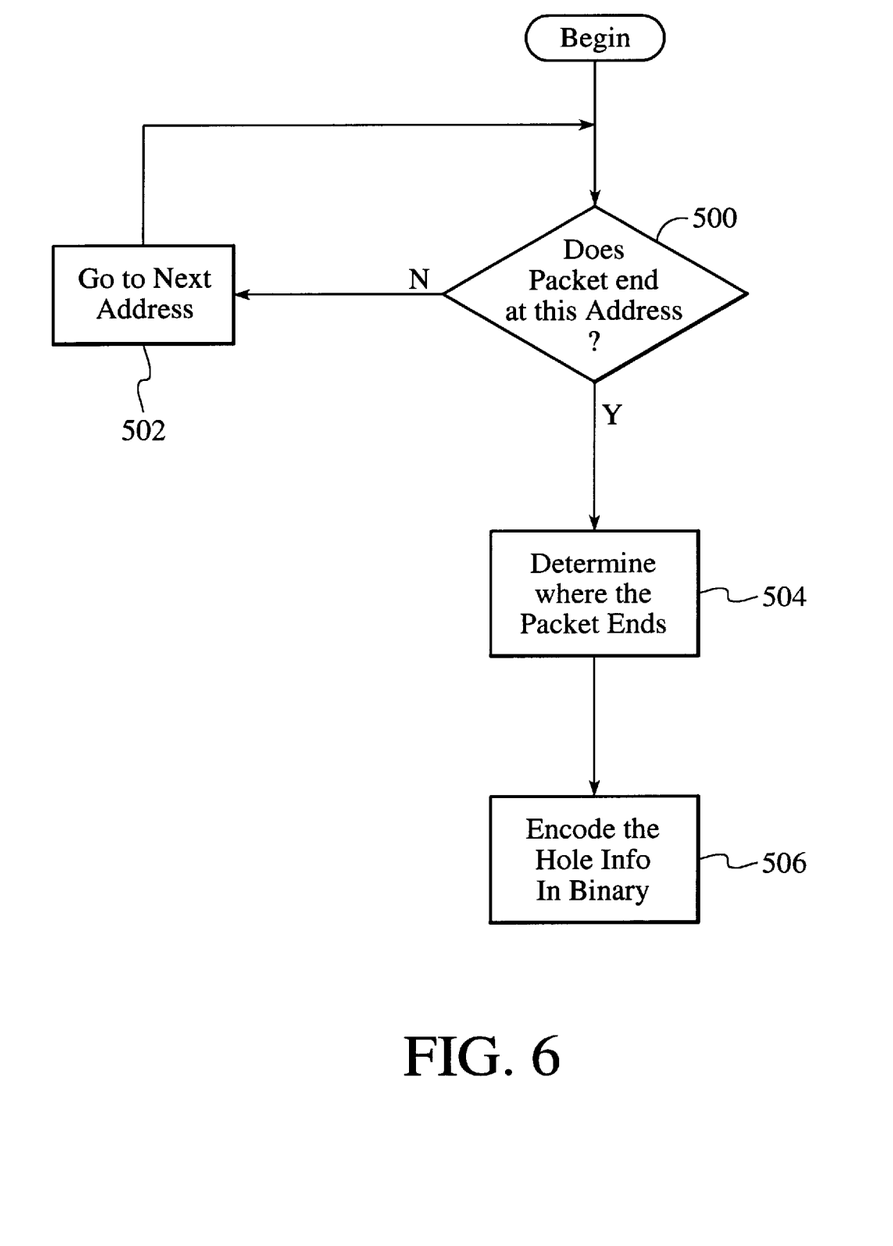
FIG. 6 is a flow diagram of one method according to the present invention.

FIG. 6 is a flow diagram of one method according to the present invention. It is first determined whether a packet ends at a particular address via step 500. If not, the next address is evaluated via step 502 and 500. Once an address is found in which the packet ends, it is determined where within the address the packet ends via step 504. Then the hole information of the address in which the packet ends is encoded in binary via step 506. For example, for a 32 bit wide memory, byte 0 can be encoded as 00 in binary; byte 1 as 01; byte 2 as 10; and byte 3 as 11. In this manner, the overhead for maintaining the hole information is reduced.

Figure 7:
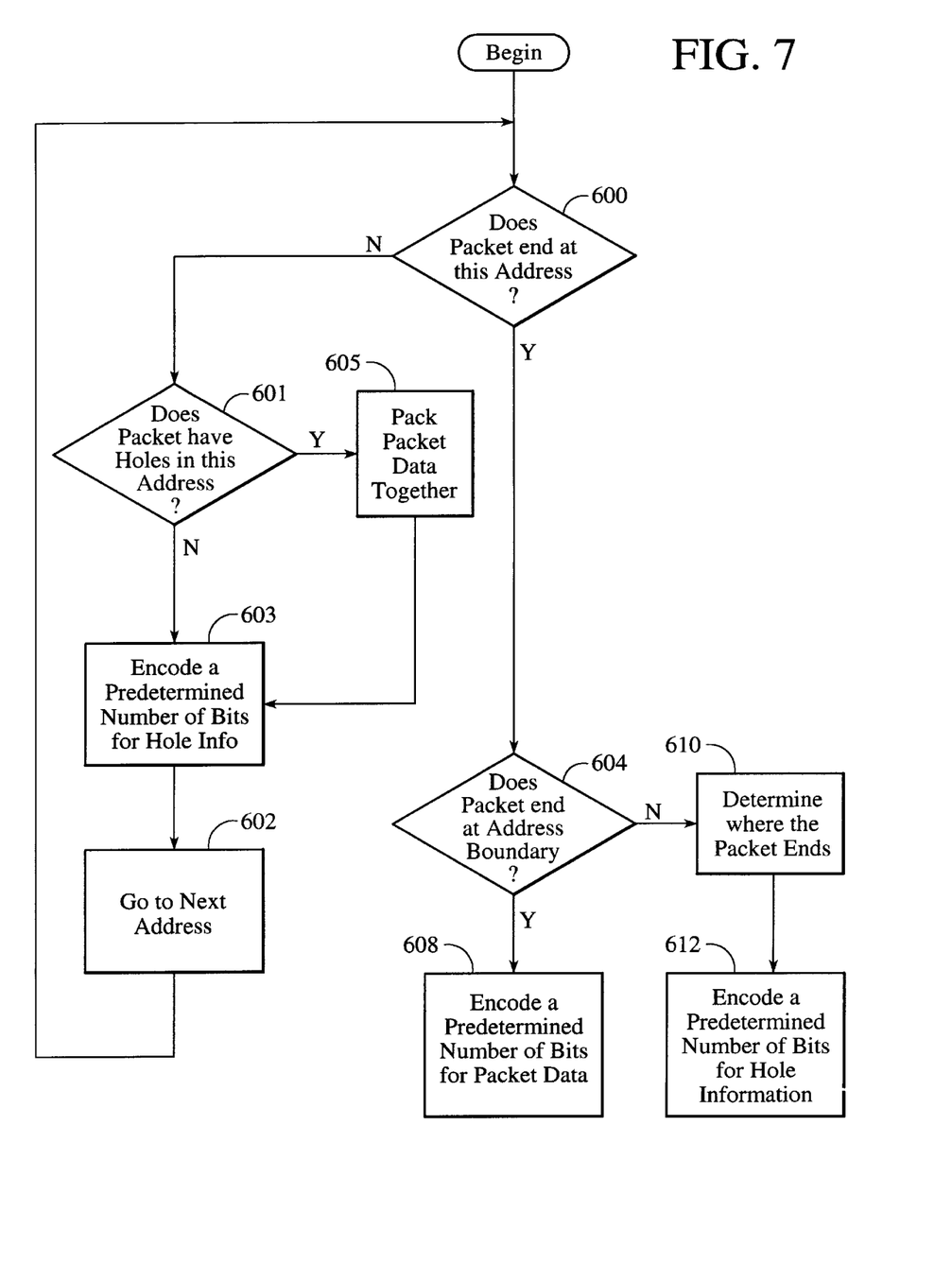
FIG. 7 is a flow diagram of another method according to the present invention.

Another method according to the present invention is illustrated in the flow diagram shown in FIG. 7. In a system and method according to the present invention, additional information, such as HOLE information, can be stored in the unused portions of an address which stores at least a portion of a packet. If a packet ends at an address boundary, thereby leaving no unused portions of the address, then a predetermined number of bits is encoded and a portion of the encoded bits, preferably one bit, is used to indicate that the packet ends at the address boundary. In this instance, no HOLE information is required since indication of a packet ending at an address boundary indicates a lack of HOLES.

Likewise, one of the encoded bits is preferably used to indicate that the packet does not end at the address boundary when such is the case. This bit information indicates that the information stored in the encoded bits in a predetermined location is additional information. An example of predetermined number of bits in a predetermined location to be encoded is the four most significant bytes such as the last byte of each address. The additional information can include merely the HOLE information, or it can indicate where the packet ends in addition to other information which may be stored in the portions unused by the packet.

First it is determined whether the packet ends at a particular address via step 600. If not, it is determined whether the packet has HOLES in this address via step 601. It is possible that the packet has HOLES at a location other than the end of the packet. If HOLES are found, then the data is packed together to combine the packet in a continuous form and to have the HOLES in a predetermined location such as the four most significant bits of the address via step 605. If no HOLES are found, or after the data is packed together, then a predetermined number of bits is encoded for additional information, via step 603. Then, the next address is evaluated via step 602 and 600.

Once an address is found in which the packet ends, it is determined whether the packet ends at the address boundary via step 604. The situation in which a packet ends at the address boundary is a situation in which the packet fills the entire address.

If a packet ends at an address boundary, a predetermined number of bits, preferably a shifting of the four most significant bits to five bits, can be encoded to indicate that the packet ends at the address boundary via step 608. Thereby indicating that there are no HOLES in this address and that all of the data in the address is associated with the packet. Note that it is preferable to encode a predetermined number of bits in a predetermined location, such as encoding the four most significant bits to five bits of encoded information, for every address including the address in which the packet ends at the address boundary. The main difference in the encoding of addresses in which the packet does not end and the address in which the packet ends is that the predetermined number of bits are encoded bits indicating that the packet ends at the address boundary.

If the packet does not end at the address boundary, then the predetermined number of bits are encoded to indicate that the packet does not end at the address boundary and that the encoded bits include additional information such as HOLE information. It is then determined where the packet ends via step 610. Finally, the additional information is encoded within the space available in the HOLES via step 612. As previously stated, the additional information includes information such as HOLE information. It is preferable that the four most significant bits of the last byte within the address is shifted to five bits indicating encoded HOLE information.

Figure 8A:
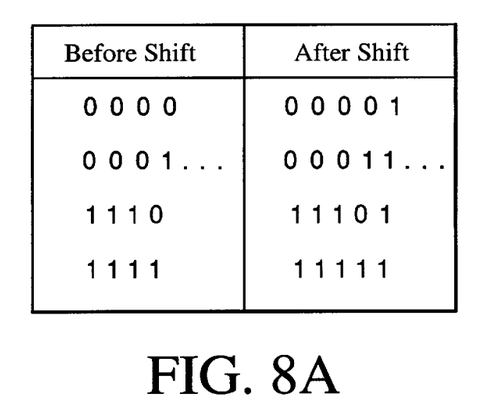
FIGS. 8A–8C are charts depicting possible ways of encoding bits to indicate additional information according to the present invention.
Figure 8B:
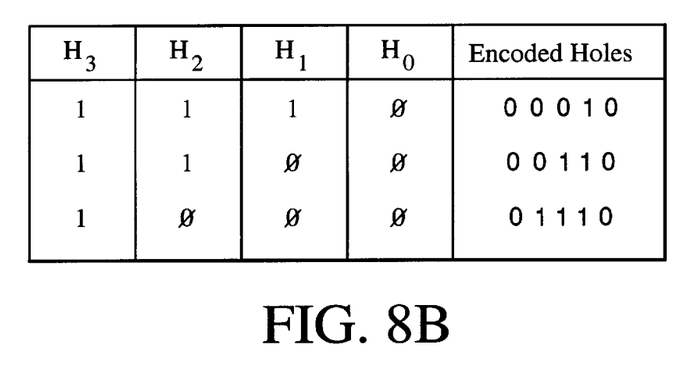
Figure 8C:
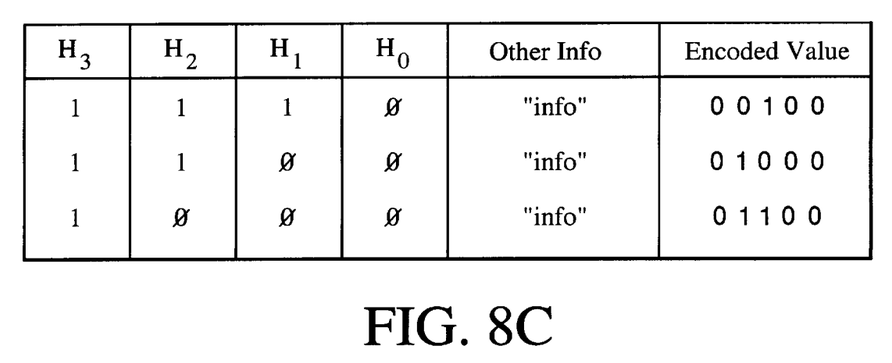

FIG. 8A, 8B and 8C illustrate possible ways of encoding the preferable predetermined number of bits in a predetermined location. FIG. 8A shows a shifting of bits in an address during encoding to allow for a set of encoded bits, one of which preferably indicates whether the packet ends at the address boundary. It is irrelevant whether 0 or 1 is used to indicate that the packet ends the address boundary so long as it is consistent FIGS. 8B and 8C show encoded values for the HOLE information in the four most significant bits. In this example, the fifth encoded bit is used to indicate whether the packet ends at the address boundary, while the remaining encoded bits indicate a unique value which indicates either the additional information or the packet data, whichever applies. The examples used in FIGS. 8B and 8C uses 0's to indicate that the remaining encoded information indicates additional information. The encoded information in FIG. 8B indicates HOLE information, while the encoded information in FIG. 8C also indicates other additional information. As previously stated, the actual encoding is irrelevant, only that it uniquely and consistently indicates a predetermined meaning.

Figure 9:
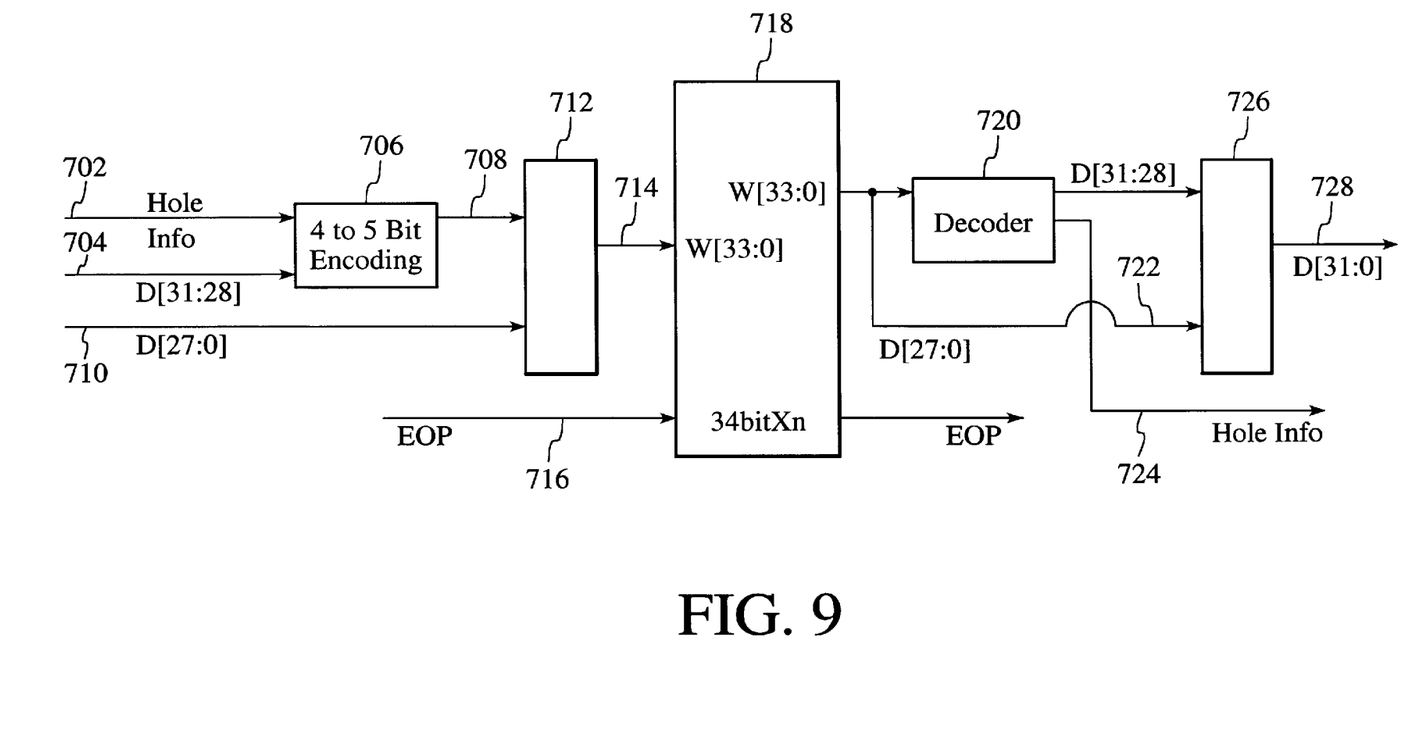
FIG. 9 is a functional block diagram showing an example of the method according to the present invention illustrated in FIG. 7.

FIG. 9 is a functional block diagram showing an example of the method according to the present invention illustrated in FIG. 7. In this example, it is assumed that an address with an end of packet tag (EOP) 716 has been found. Either the HOLE information 702 or the packet data 704, bits 28–31, become encoded via the encoder 706. The packet data (D[31:28]) 704 is encoded from four to five bits if the packet ends at the address border. The HOLE information 702 is encoded from four to five bits if the packet does not end at the address border. The remainder of the packet (D[27:0]) 710 is not encoded. The encoded bits are combined with the non-encoded bits at functional box 712 which receives the packet data 710 and the output of the encoder 706. The combined data 714 is held in the buffer 718 along with the EOP tag until the data is ready to be received by the system bus or ready to be sent to the wire.

Assuming the encoded data indicates that the packet ends at the address border, the encoded data is outputted to the decoder 720, while the non-encoded packet data 722 is sent to the function box 726 to be combined with the decoded packet data. This combination is outputted at 728 where the packet data is again whole.

If the encoded data indicates that the packet does not end at the address border, the encoded data is outputted to the decoder 720, decoded, and outputted as additional information 724 including information such as HOLE information. The non-encoded data can be directly outputted at 728 since none of its contents were encoded.

Figure 10:
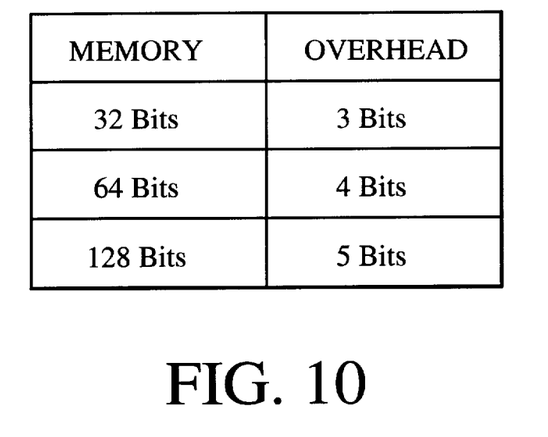
FIG. 10 is a chart depicting the overhead required for various sizes of memory according to the method depicted in FIG. 6.

FIG. 10 is a table showing the overhead required in various size memories when the method according to the present invention as shown in FIG. 6 is utilized. With a 32-bit memory, the total overhead would be three bits; one for the EOP and two for the binary indication of where the address packet ends. With a 64 bit memory, the overhead would be 4 bits, while with 128 bit memory, the overhead would be 5 bits.

Figure 11:
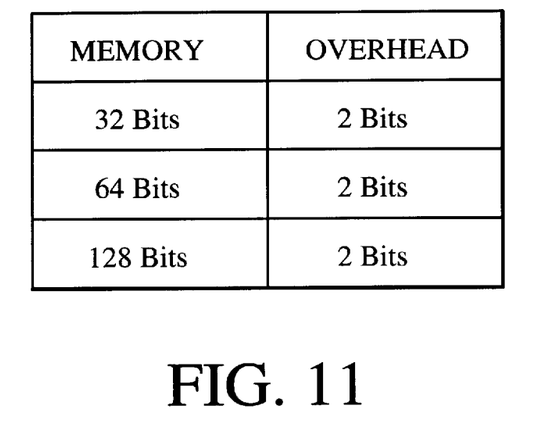
FIG. 11 is a table indicating the overhead required for various sizes of memory according to the method depicted in FIG. 7.

FIG. 11 is a table showing the overhead requirements of various memories for the method according to the present invention as shown in FIG. 7. For all size memories, only two extra bits would be required as the overhead. One bit would indicate the EOP, while the remaining extra bit indicates whether the packet ends at an address boundary, thus indicating whether the information located in the four most significant bits of the last byte is packet data or HOLE data.

Although the system and method has been described in accordance with the embodiments shown, one of ordinary skill in the art will readily recognize that there could be variations to the embodiments and those variations would be within the spirit and scope of the above-described system and method. Accordingly, many modifications may be made by one of ordinary skill in the art without departing from the spirit and scope of the appended claims.

What is claimed is:

1. A method for efficiently storing additional information in a memory, the memory including at least one address, the memory for storing at least a portion of a packet to be transferred by a network system, the method comprising the steps of:

a) determining whether the at least a portion of a packet ends at a boundary of the at least one address;

b) encoding a portion of the packet to indicate that the packet ends at the address boundary, if the packet ends at the address boundary; and c) encoding a portion of the at least one address to indicate that the packet does not end at the address boundary, if the packet does not end at the address boundary.

2. The method of claim 1, further comprising the step of storing additional information in the memory if the packet does not end at the address boundary.

3. The method of claim 1, further comprising the step of determining where the packet ends in response to the packet not ending at the address boundary.

4. The method of claim 1, further comprising the step of encoding the additional information.

5. The method of claim 1, further comprising the step of encoding a predetermined number of bits.

6. The method of claim 5, wherein the predetermined number of bits is in a predetermined location within the address.

7. The method of claim 6, wherein the predetermined location within the address is a portion of the address which is unused by the packet if the packet does not end at the address border.

8. The method of claim 5, wherein the predetermined number of bits is the four most significant bits.

9. The method of claim 5, wherein at least a portion of the packet is encoded in the predetermined number of bits if the packet ends at the address border.

10. The method of claim 5, wherein the additional information is encoded in the predetermined number of bits if the packet does not end at the address border.

11. The method of claim 10, wherein additional information includes HOLE information.

12. The method of claim 5, wherein at least a portion of the packet is encoded in the predetermined number of bits in each address.

13. The method of claim 5, wherein the predetermined number of bits is encoded to a number of bits equaling at least the predetermined number plus one.

14. The method of claim 1, further comprising the step of storing additional information in the memory if a HOLE is found in the address.

15. A system for storing additional information which is stored along with at least a portion of a packet to be transferred by a network system, the system comprising:

a buffer including a plurality of addresses, the buffer storing the at least a portion of a packet to be transferred by a network system;

an encoder coupled to the buffer to encode information, wherein a portion of the packet is encoded to indicate that the packet ends at the address boundary, if the packet ends at the address boundary and wherein a portion of the at least one address is encoded to indicate that the packet does not end at the address boundary, if the packet does not end at the address boundary;

a decoder coupled to the buffer to decode the encoded information; and a controller to determine whether either the portion of the packet or at least one address becomes encoded.

16. The system of claim 15, wherein the encoder encodes a predetermined number of bits in an address.

17. The system of claim 16, wherein the predetermined number of bits is located in a predetermined position within the address.

18. The system of claim 16, wherein the encoded bits are encoded with packet data.

19. The system of claim 16, wherein the additional information includes HOLE information.

20. The system of claim 15, wherein the encoder encodes a predetermined number of bits which indicates whether the packet ends at an address boundary.

21. A system for storing additional information which is stored along with at least a portion of a packet to be transferred by a network system, the system comprising:

means for data storage, the storage means including a plurality of addresses, the storage means storing at least a portion of a packet to be transferred by a network system;

means for encoding coupled to the storage means to encode information, wherein the information includes a portion of the packet, which is encoded to indicate that the packet ends at the address boundary, if the packet ends at the address boundary, or a portion of the at least one address, which is encoded to indicate that the packet does not end at the address boundary, if the packet does not end a the address boundary;

means for decoding coupled to the storage means to decode the encoded information; and means for controlling coupled to the storage means and encoding means to determine whether either the portion of the packet or the at least one address becomes encoded.

22. A method of storing HOLE information in a buffer including a plurality of addresses, the buffer storing at least a portion of a packet to be transferred by a network system, the method comprising the steps of:

a) determining at which address the packet ends;

b) determining where in the address the packet ends; and c) encoding HOLE information in binary numbers, wherein the encoded binary numbers indicate a byte location within the address at which the packet ends, wherein the HOLE information is stored in an unused portion of the address if the packet does not ends at a boundary of the address, and wherein the HOLE information is not required if the packet ends at the boundary.

* * * * *